United States Patent

Hayakawa et al.

Patent Number: 5,771,376
Date of Patent: Jun. 23, 1998

[54] PIPELINE ARITHMETIC AND LOGIC SYSTEM WITH CLOCK CONTROL FUNCTION FOR SELECTIVELY SUPPLYING CLOCK TO A GIVEN UNIT

[75] Inventors: Hiroshi Hayakawa, Nagoya; Harutsugu Fukumoto, Anjo; Hiroaki Tanaka, Okazaki, all of Japan

[73] Assignee: Nippondenso Co., Ltd, Kariya, Japan

[21] Appl. No.: 725,495

[22] Filed: Oct. 4, 1996

[30] Foreign Application Priority Data

Oct. 6, 1995 [JP] Japan ................................. 7-260412

[51] Int. Cl.⁶ ............................................ G06F 9/38
[52] U.S. Cl. ................................. 395/561; 395/376
[58] Field of Search ......................... 395/376, 555, 395/561

[56] References Cited

U.S. PATENT DOCUMENTS

| | | | |
|---|---|---|---|
| 3,840,861 | 10/1974 | Amdahl et al. | 395/556 |
| 4,365,311 | 12/1982 | Fukunaga et al. | 395/555 |
| 4,471,432 | 9/1984 | Wilhite et al. | 395/403 |
| 5,134,562 | 7/1992 | Hattori et al. | 395/452 |

FOREIGN PATENT DOCUMENTS

| | | |
|---|---|---|
| 55-033235 | 3/1980 | Japan. |
| 58-103041 | 6/1983 | Japan. |
| 60-230239 | 11/1985 | Japan. |
| 61-019072 | 5/1986 | Japan. |
| 62-160529 | 7/1987 | Japan. |
| 4-181409 | 6/1992 | Japan. |
| 6-295243 | 10/1994 | Japan. |
| 7-105001 | 4/1995 | Japan. |

*Primary Examiner*—Krisna Lim
*Attorney, Agent, or Firm*—Cushman Darby & Cushman IP Group of Pillsbury Madison & Sutro LLP

[57] ABSTRACT

A pipeline arithmetic and logic system capable of adjusting operational timings among stages without using an NOP instruction, providing a size reduction of its control section. The system has a decoder set including decoder groups divided into a decoder group for controlling an arithmetic section unit, a register file unit and a program counter unit, and a decoder for control of an address unit, and further including a clock control unit controlled by the address unit control decoder. A clock signal from an external source is directly fed to the address unit while being fed through the clock control unit to the other units. When fetching a data transfer instruction and repeatedly executing an MA stage twice, the system stops the clock control unit at the execution of the first MA stage to inhibit the operations of the units other than the address unit.

7 Claims, 4 Drawing Sheets

FIG. 3

| IF | ID | EX | MA | WB |    |    |    |    |
|----|----|----|----|----|----|----|----|----|
|    | IF | ID | EX | MA | WB |    |    |    |
|    |    | IF | ID | EX | MA | WB |    |    |
|    |    |    | IF | ID | EX | MA | WB |    |
|    |    |    |    | IF | ID | EX | MA | WB |
|    |    |    |    |    | IF | ID | EX | MA | WB |

FIG. 5 PRIOR ART

| IF | ID | EX | MA | WB  |     |    |    |    |    |
|----|----|----|----|-----|-----|----|----|----|----|
|    | IF | ID | EX | MA  | WB  | 301|    |    |    |
| 300 → | IF | ID | EX | MA | MA | WB |   |    |    |
|    |    | IF | ID | EX | —   | MA | WB |    |    |
|    |    |    | IF | ID | —   | EX | MA | WB |    |
|    |    |    |    | IF | —   | ID | EX | MA | WB |

311

PIPELINE ARITHMETIC AND LOGIC SYSTEM WITH CLOCK CONTROL FUNCTION FOR SELECTIVELY SUPPLYING CLOCK TO A GIVEN UNIT

BACKGROUND OF THE INVENTION

1. [Field of the Invention]

The present invention relates to a pipeline arithmetic and logic system or pipeline operation system with a clock control function to allow the simplification and size reduction of its control section.

2. [Description of the Prior Art]

A pipeline arithmetic and logic system has hitherto been known, wherein an operation function is divided into a plurality of stages to make the respective divided stages fulfill processing in parallel so that a plurality of instruction processing cycles are effected at partially overlapped timings. As one example of such a prior art system, there is a microprocessor which executes 5-stage pipeline processing. In this microprocessor, its operational function is divided into five stages: IF (instruction fetch), ID (instruction decoding), EX (execution), MA (memory access), WB (write-back), so that the pipeline processing is effected in a parallel relationship as shown in FIG. 3.

For the pipeline processing, as shown in FIG. 4 such a microprocessor fetches an instruction from a memory (not shown) through a data bus 3 according to data carried through an address bus 4. The microprocessor comprises a decoder set 1 for decoding the instruction and a data path 2 controlled on the basis of a control signal from the decoder set 1 and a clock signal 5 from an external source. The data path 2 includes an arithmetic section 2-1 for execution of logic, arithmetic, shift operation and others, a register file 2-2 for storage of the operation results, a program counter 2-3 for counting the addresses of the current program, and an address unit 2-4 for switching the output of the operation section 2-1 or the program counter 2-3 to the address bus 4.

In cases where the internal bus width is larger than the external bus width, for example, the external bus width is 16 bits while the internal bus width is 32 bits, the prior microprocessor needs to repeatedly perform the MA stage plural times. For this reason, if an instruction for transferring data between the microprocessor and the memory is read out as a nth instruction in an IF state 300 as shown in FIG. 5, in this nth instruction processing cycle, the processing assumes IF-ID-EX-MA-MA-WB, that is, repeats the MA stage. In the processing cycle for an instruction for shifting to the (n+1)th cycle, in order to avoid the turbulence of the pipeline due to the repeated execution of the MA stage, the execution is inhibited in such a manner that an NOP (no-operation) instruction is given to a stage group 311 for the subsequent instruction when the second MA stage 301 comes into execution.

However, the prior way of avoiding the turbulence of the pipeline through the use of the NOP instruction creates a problem in that the control section becomes complicated.

SUMMARY OF THE INVENTION

It is therefore an object of the present invention to provide a pipeline arithmetic and logic system which is capable of adjusting the operational timings among the stages without using the NOP instruction.

For this purpose, in a pipeline arithmetic and logic system according to the present invention, a clock control means is provided to supply a clock signal to only a unit for a portion of the stage operation while not supplying it to the other units. More specifically, a means is provided to make a clock signal from the external fork (branching) and give it through a clock control unit to some unit, and an output stopping means is provided to stop the output of the clock control unit when necessary. With this arrangement of stopping the clock signal according to the present invention, the stage operations other than a specific stage operation does not take place, thus adjusting the execution timings among the stages. Accordingly, because of no use of the NOP signal, the final-stage latch section of each stage does not require the incorporation of a control section for executing the NOP instruction, and hence the whole control section is free from a complicated structure.

In this pipeline arithmetic and logic system, when fetching or reading out an instruction including the processing of repeating the same stage operation plural times, while supplying a clock signal plural times to a unit for a stage operation to be repeated, the clock supply control means supplies only a clock signal corresponding to one operation to a unit for the other state operation. This allows a plurality of cycle instructions to be treated as one cycle instruction. In this case, the clock supply control means is particularly effective if the MA stage is made to be operative in response to an instruction that continues plural times. More specifically, the address unit and the decoder for the address unit directly accept a clock signal from the external source, whereas the other units and the decoders therefor receive the clock signal through the clock control unit, with the clock control unit being controlled by the address unit decoders. With this arrangement, the clock signal can be made to be given to only the address unit. For example, when the clock supply control means fetches an instruction for repeatedly executing the MA stage n times, if throughout the repetition of the first to (n−1)th MA stages the address unit decoder continuously stops the output of the clock control unit, the repetition of the MA stages can be realized without relying upon the NOP instruction while avoiding the turbulence of the pipeline. The supply of the clock signal to the units other than the address units is once produced at any one of the repetition times for the first to nth MA stage operations, whereas the supply thereof stops at the other timings. For example, the clock supply comes under control to stop at the first to (n−1)th MA stage operations, while the clock is supplied at the nth MA stage operation.

BRIEF DESCRIPTION OF THE DRAWINGS

The object and features of the present invention will become more readily apparent from the following detailed description of the preferred embodiments taken in conjunction with the accompanying drawings in which:

FIG. 3 is an illustration of a general flow of stage operations in pipeline processing;

FIG. 5 is an illustration of a pipeline flow relative to a data transferring instruction in the prior art.

DETAILED DESCRIPTION OF THE INVENTION

Figure 1:
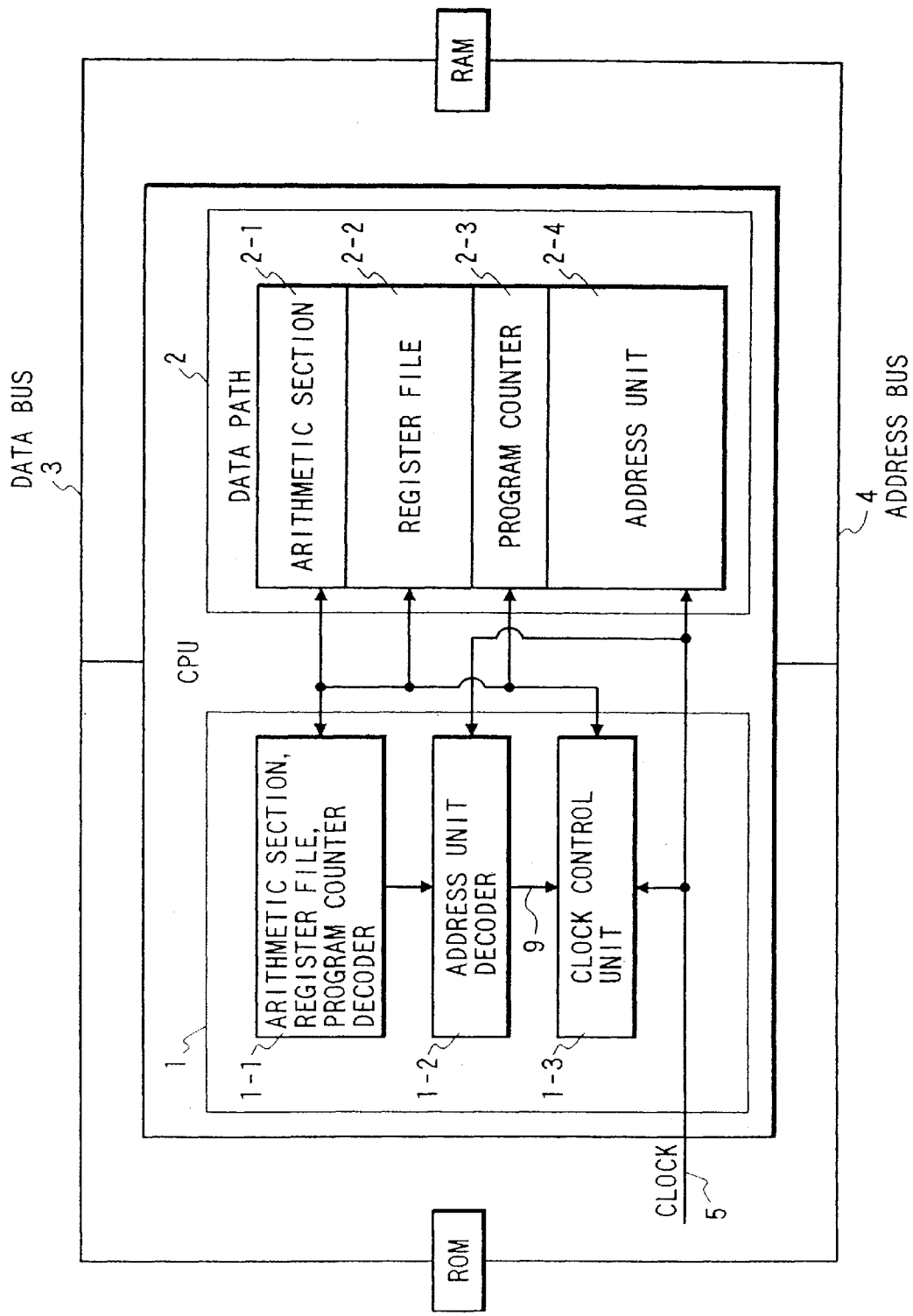
FIG. 1 is a block diagram showing the whole arrangement of a microprocessor according to an embodiment of the present invention.

Referring now to the drawings, a description will be made hereinbelow of an embodiment of the present invention. A microprocessor according to this embodiment is made such that an internal bus assumes a 32-bit structure and an external bus employs a 16-bit structure. As shown in FIG. 1 a decoder set 1 comprises decoder groups divided into a decoder group 1-1 for controlling an arithmetic section unit, a register file unit and a program counter, and an address unit control decoder 1-2, and further includes a clock control unit 1-3 controlled by the address unit control decoder 1-2. This arrangement of the decoder set 1 differs from that of the conventional microprocessor. A clock signal 5 from the external source directly comes into an address unit 2-4 and the address unit control decoder 1-2, while it enters, through the clock control unit 1-3 of the decoder set 1 to an arithmetic section unit 2-1, a register file unit 2-2, a program counter 2-3 and the aforesaid decoder group 1-1 for these units. The clock control unit 1-3 comprises a gate circuit or the like to exert a switching function in response to a signal from the address unit control decoder 1-2.

In this embodiment, because of the difference in scale between the internal bus and the external bus, the address unit control decoder 1-2 repeatedly fulfills the MA stage twice in response to a data transfer instruction. Thus, in the ID stage or the EX stage of an instruction processing cycle, a decision regarding the data transfer instruction is made. The address unit control decoder 1-2 outputs a clock stopping signal 9 to the clock control unit 1-3 at the first MA stage execution timing to stop the output of the clock signal. In consequence, only the address unit 2-4 receives the clock signal so that only the first MA stage is put into effect. Furthermore, at the second MA stage execution corresponding to the data transfer instruction, the clock signal is supplied for the other stages. The other stages do not start until receiving the clock signal. Thus, when the processing cycle for the data transfer instruction advances from the MA stage to the WB stage, the other parallel processing cycles respectively proceed from the EX stage to the MA stage or the like, thereby executing the control to prevent the turbulence of the pipeline.

Figure 2A:
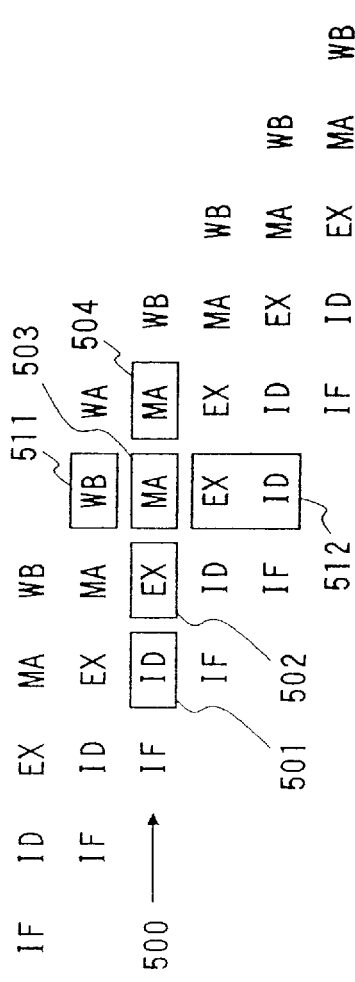
FIG. 2(A, B, C) is an illustration of the relationship between a clock signal and a flow of a pipeline responsive to a data transferring instruction in the embodiment of this invention.
Figure 2B:
Figure 2C:
Figure 4:
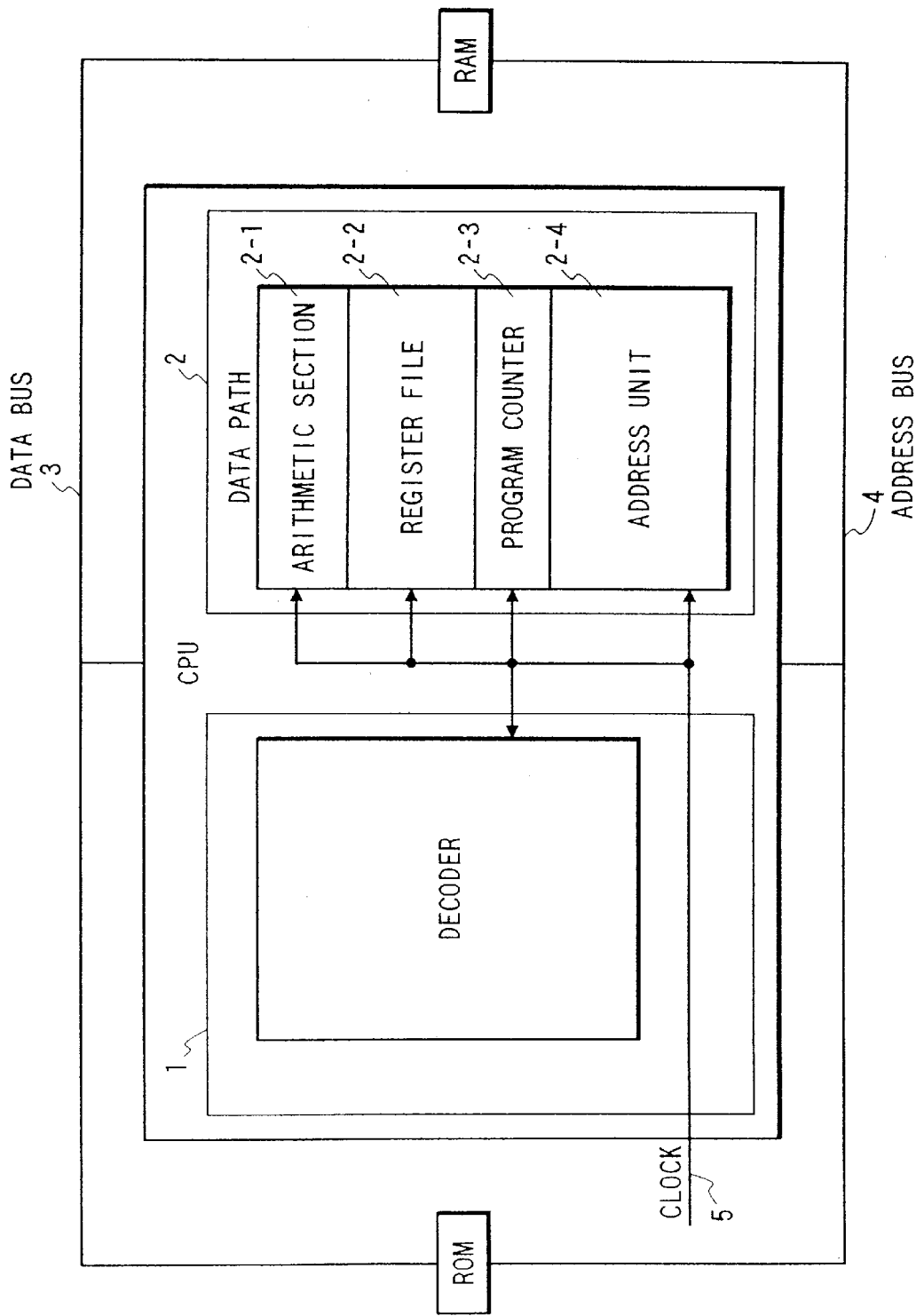
FIG. 4 is a block diagram showing the entire arrangement of a prior art microprocessor.

FIG. 2 expresses the relationship between a pipeline flow corresponding to a data transfer instruction and a clock signal. When the pipeline microprocessor accepts a data transfer instruction 501 as shown by (A) of FIG. 2, in an ID state 500 or an EX stage 502 a decision is made such that a condition to stop the clock signal to the other stages takes place during the execution of a first MA stage 503. As a result of this decision, the clock signal itself from the external source periodically comes in as shown by (B) of the illustration, whereas the clock signal passing through the clock control unit 1-3 drops out at the time of the execution of the first MA stage 503 as shown by (C) of the illustration. In addition, the clock signal does not again enter the arithmetic section unit 2-1 and others until the execution of a second MA stage 504.

For this reason, when in the cycle for processing the data transfer instruction the processing advances from the first MA stage 503 to the second MA stage 504, stage shifting does not take place in the other instruction processing cycles, with the result that the EX stage or the like remains as it is. Thus, even if the MA stage is repeated due to the data transfer instruction, the turbulence of the pipeline does not occur regardless of the absence of using a NOP instruction. In consequence, when viewed from the decoder set 1 side, the instruction by which the execution of the MA stage continues is one cycle instruction, thereby allowing the control section to be small.

It should be understood that the foregoing relates to only a preferred embodiment of the present invention, and that it is intended to cover all changes and modifications of the embodiment of the invention herein used for the purposes of the disclosure, which do not constitute departures from the spirit and scope of the invention.

What is claimed is:

1. A pipeline arithmetic and logic unit, comprising:
   processing means for dividing an operational function into a plurality of stages in order to perform respective stage operations in parallel, such that a plurality of instruction processing cycles are executed at partially overlapped timings; and
   clock control means, associated with said processing means, for supplying a clock signal to a unit of said processing means for a portion of said respective stage operations while not supplying said clock signal to other units of said processing means during said portion of said respective stage operations, wherein
   when said processing means fetches an instruction requiring processing for repeating one stage operation a plurality of times, said clock control means supplies said clock signal only once to said other units while supplying said clock signal said plurality of times to said unit used to execute said one stage operation said plurality of times.

2. The pipeline arithmetic and logic unit as defined in claim 1, wherein said clock control means comprises:
   a clock control unit receiving an external clock signal from an external source and outputting said clock signal to at least one unit; and
   output stopping means for stopping said clock signal from being output from said clock control unit when necessary.

3. The pipeline arithmetic and logic unit as defined in claim 1, wherein said clock control means is operative in response to an instruction for continuously executing a memory access stage said plurality of times.

4. A pipeline arithmetic and logic system comprising:
   a data path comprising:
      an arithmetic section unit,
      a register file unit,
      a program counter, and
      an address unit; and
   a decoder set including decoder groups for controlling respective units of said data path, said decoder groups supplying control signals to said respective units of said data path in parallel in accordance with an external clock signal from an external source so that a plurality of instruction processing cycles are executed at partially overlapped timings, wherein:
   said decoder groups comprise:
      an address unit decoder, and
      a clock control unit;
   said external clock signal from said external source is directly fed to said address unit and said address unit decoder while being fed through said clock control unit to other units of said data path and other units of said decoder groups, and
   said address unit decoder controls said clock control unit so that said external clock signal is supplied only to said address unit.

5. A pipeline arithmetic and logic unit, comprising:
   processing means for dividing an operational function into a plurality of stages in order to perform respective stage operations in parallel, such that a plurality of instruction processing cycles are executed at partially overlapped timings; and clock control means, associated with said processing means, for supplying a clock signal to a unit of said processing means for a portion of said respective stage operations while not supplying said clock signal to other units of said processing means during said portion of said respective stage operations.

6. The pipeline arithmetic and logic unit as defined in claim 5, wherein said clock control means is operative in response to an instruction for continuously executing a memory access stage a plurality of times.

7. The pipeline arithmetic and logic unit as defined in claim 5, wherein said clock control means comprises:

a clock control unit receiving an external clock signal from an external source and outputting said clock signal to at least one unit; and output stopping means for stopping said clock signal from being output from said clock control unit when necessary.

* * * * *